(12) United States Patent
Cuddeback et al.

(10) Patent No.: US 6,449,431 B1
(45) Date of Patent: Sep. 10, 2002

(54) ENCLOSURE FOR WILDLIFE SURVEILLANCE SYSTEM AND SECURITY APPARATUS THEREFORE

(75) Inventors: Mark John Cuddeback, Green Bay; Jeremy Stephen Nesthus, Waukesha, both of WI (US)

(73) Assignee: Non Typical Inc., Park Falls, WI (US)

( * ) Notice: Subject to any disclaimer, the term of this patent is extended or adjusted under 35 U.S.C. 154(b) by 0 days.

(21) Appl. No.: 09/906,409

(22) Filed: Jul. 16, 2001

(51) Int. Cl.[7] ............................................... G03B 17/08
(52) U.S. Cl. .......................... 396/27; 396/427; 396/433
(58) Field of Search ........................... 396/25, 27, 419, 396/427, 429, 433

(56) References Cited

U.S. PATENT DOCUMENTS

| | | | |
|---|---|---|---|
| 4,294,387 A | * 10/1981 | Wnek | 224/315 |
| 5,128,548 A | 7/1992 | Goodson et al. | |
| 5,517,201 A | 5/1996 | Thompson, Jr. | |
| 5,867,682 A | * 2/1999 | Witt et al. | 711/147 |

OTHER PUBLICATIONS

Basspro.com, p. 72 of mail order catalog.

* cited by examiner

Primary Examiner—David M. Gray
(74) Attorney, Agent, or Firm—Boyle Fredrickson Newholm Stein & Gratz S.C.

(57) ABSTRACT

An enclosure for a wildlife surveillance assembly includes a base configured to house a surveillance assembly and a cover coupled to the base with a hinge so as to permit rotating movement therebetween. In addition, the enclosure includes a locking assembly that secures the enclosure to a mounting structure. And prevents removal of the enclosure from the mounting structure without opening the cover of the enclosure. The base further preferably includes first and second compartments that are environmentally isolated from one another and includes openings to accommodate the locking assembly. In the preferred embodiment, the locking mechanism includes a flexible cable having opposed ends, with an abutment coupled to one of the ends. A collar is slidably coupled to the flexible cable and adapted to be locked to the flexible cable at a desired position.

20 Claims, 9 Drawing Sheets

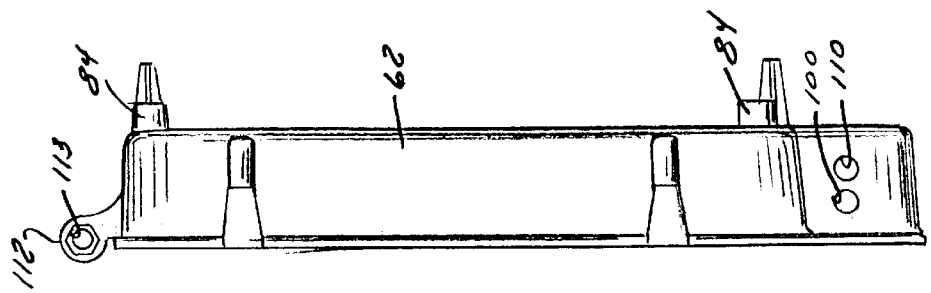
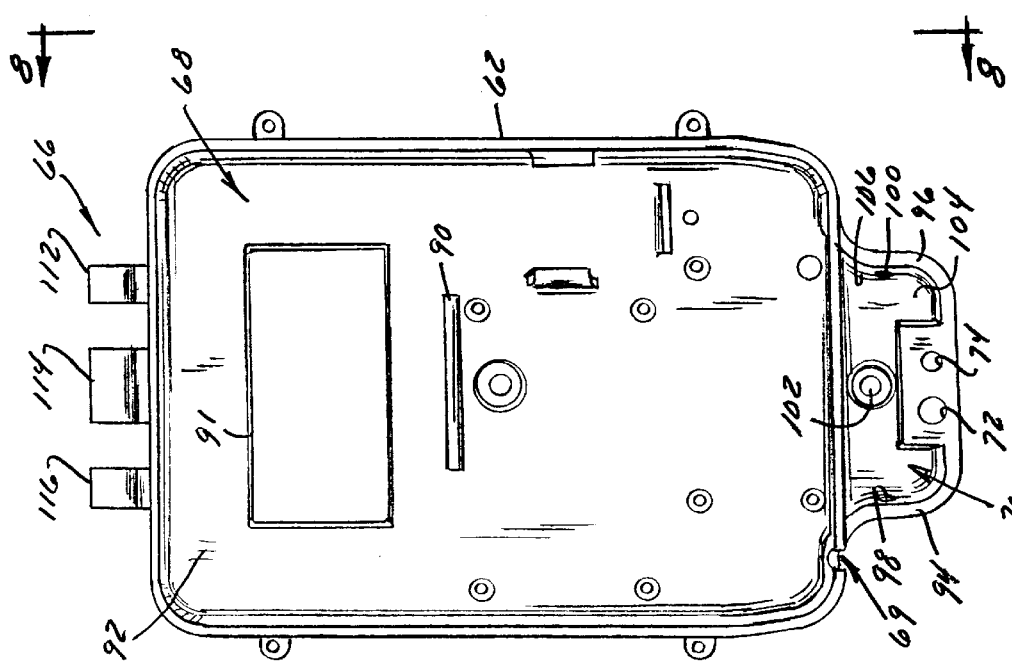

US 6,449,431 B1

ENCLOSURE FOR WILDLIFE SURVEILLANCE SYSTEM AND SECURITY APPARATUS THEREFORE

BACKGROUND OF THE INVENTION

1. Field of the Invention

The present invention relates to apparatus for scouting potential hunting areas and determining game patterns, and more particularly, enclosures for wildlife cameras including security apparatus therefore.

2. Description of the Related Art

Apparatus for scouting potential hunting areas and determining game patterns, particularly without disturbing animal activity, are generally well-known in the art. Typically, the apparatus includes a camera and a passive infrared sensor (e.g., a motion/heat sensor) that is adapted to sense movement, and in response, activate a camera focused on the area in which the sensor detects movement. Often times, these devices include a delay timer with multiple settings to match specific conditions or locations, thus eliminating multiple exposures. Moreover, such apparatus preferably includes high/low sensitivity settings to allow adjustment of the camera's effective range in order to photograph game at any distance up to, for example, sixty (60) feet.

In addition, such systems are typically mounted in an enclosure that is adapted to be strapped to, for example, a tree. Because the components of the surveillance apparatus must periodically be accessed (e.g., to change film), the enclosure is typically designed for ready entry to its interior. For example, a door may be included to provide access its interior. Moreover, the enclosure typically includes openings or windows to accommodate, for example, a view path for the camera and sensor of the apparatus. Also, all the components are preferably sealed in the enclosure to protect the components from the environment.

To make its appearance inconspicuous, the enclosure is typically appropriately colored/contoured to camouflage the unit. Because the surveillance apparatus is often times left out in the woods for extended periods of time, the camouflage not only hides the unit from unsuspecting game, it also helps to prevent theft of the apparatus. Nevertheless, even if camouflaged, security is a concern.

Most known units typically also include a latch and locking mechanism, thus making it difficult to break into the enclosure which houses the expensive surveillance apparatus, including the sensor, camera and electronics. However, known systems do not effectively address the problem of theft of the entire apparatus from where it is mounted. Although the camouflage look of the enclosures, in conjunction with the enclosure locking mechanisms, is often times sufficient to avoid theft of the units, that is not always the case.

Another problem with such known arrangements is that spurious light (for example, from the flash of the camera) will often be reflected within the interior of the enclosure and thus inadvertently contact the lens of the camera. As a result, this light interferes with the image that the camera is attempting to capture, thus compromising the integrity of the scouting function of the unit.

Therefore, the art of wildlife surveillance systems was in need of an enclosure having a ready, easy-to-use locking mechanism for ensuring the security of the relatively expensive components of the surveillance system. The apparatus should ensure the security of both the unit as a whole, including the enclosure which is strapped to the tree, and the contents of the enclosure. Moreover, the system should not compromise the integrity of the waterproof/insect-proof nature of the enclosure, should minimize the effects of spurious light impinging upon the lens of the camera, and should not be a burden on the user when opening the enclosure so that the interior of the enclosure can be readily accessed for changing film, altering operational features, and the like.

SUMMARY OF THE INVENTION

According to one aspect of the preferred embodiment, an enclosure for a wildlife surveillance assembly includes a base configured to house the surveillance assembly and a cover coupled to the base with a hinge so as to permit rotating movement therebetween. In addition, the enclosure includes a locking assembly that secures the enclosure to a mounting structure. The locking assembly prevents removal of the enclosure from the mounting structure without opening the cover of the enclosure.

According to another aspect of the preferred embodiment, the base further includes first and second compartments that are environmentally isolated from one another.

According to yet another aspect of the preferred embodiment, the enclosure further includes a foam insert disposed intermediate the surveillance system and an inside surface of the cover to minimize light reflected from the inside surface from interacting with the surveillance system.

In a further aspect of the preferred embodiment, the hinge includes a pin and a plurality of adjacent female portions, the adjacent female portions being adapted to receive the pin, and wherein at least a portion of the pin and at least some of the adjacent female portions are configured to interlock so as to selectively prevent rotating movement of the cover relative to the base.

According to a still further aspect of the preferred embodiment, the locking mechanism of the enclosure includes a flexible cable having opposed ends. Preferably, an abutment is coupled to one of the ends, and a collar is slidably coupled to the flexible cable and adapted to be locked to the flexible cable at a desired position. To accommodate the flexible cable, the enclosure includes a plurality of openings through which the cable is received.

In yet another aspect of the preferred embodiment, a locking assembly for an enclosure that houses a wildlife surveillance system and that is coupled to a mounting structure includes a flexible cable having opposed ends and having an abutment coupled to one of the ends. In addition, a collar is slidably coupled to the flexible cable and is adapted to be locked to the flexible cable at a desired position.

According to another aspect of the preferred embodiment, a method of coupling a wildlife surveillance system to a mounting structure includes the steps of providing a locking assembly and providing an enclosure having a base and a cover. The base has first and second compartments environmentally isolated from one another, and at least one of the first and second compartments includes a plurality of openings. The method also includes the steps of securing the enclosure to the mounting structure by coupling the locking assembly to the openings such that the enclosure cannot be removed from the mounting structure without opening the cover.

In another aspect of this embodiment, the locking assembly includes a flexible cable and a lock, and wherein the cover includes an opening adapted to align with one of the openings of the second compartment when the cover is closed on the base. Further, the securing step includes mating the cable with others of the openings and locking the lock to the aligned openings of the cover and the base.

According to a further aspect of this embodiment, the cable includes opposed ends, and the mating step includes feeding a first one of the opposed ends of the cable through a first one of the openings until an abutment at the second of the opposed ends is adjacent the first opening. Moreover, the mating step includes feeding the first opposed end through a second one of the openings, positioning a slidable locking collar on the first opposed end, and feeding the first opposed end through a third of the openings, and locking the slidable locking collar to the cable.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 7 is a plan view of the interior of the housing of the enclosure of FIG. 4;

FIG. 8 is a side elevational view of the housing of the enclosure of FIG. 7, taken along lines 8—8;

DETAILED DESCRIPTION OF THE PREFERRED EMBODIMENT

Figure 1:
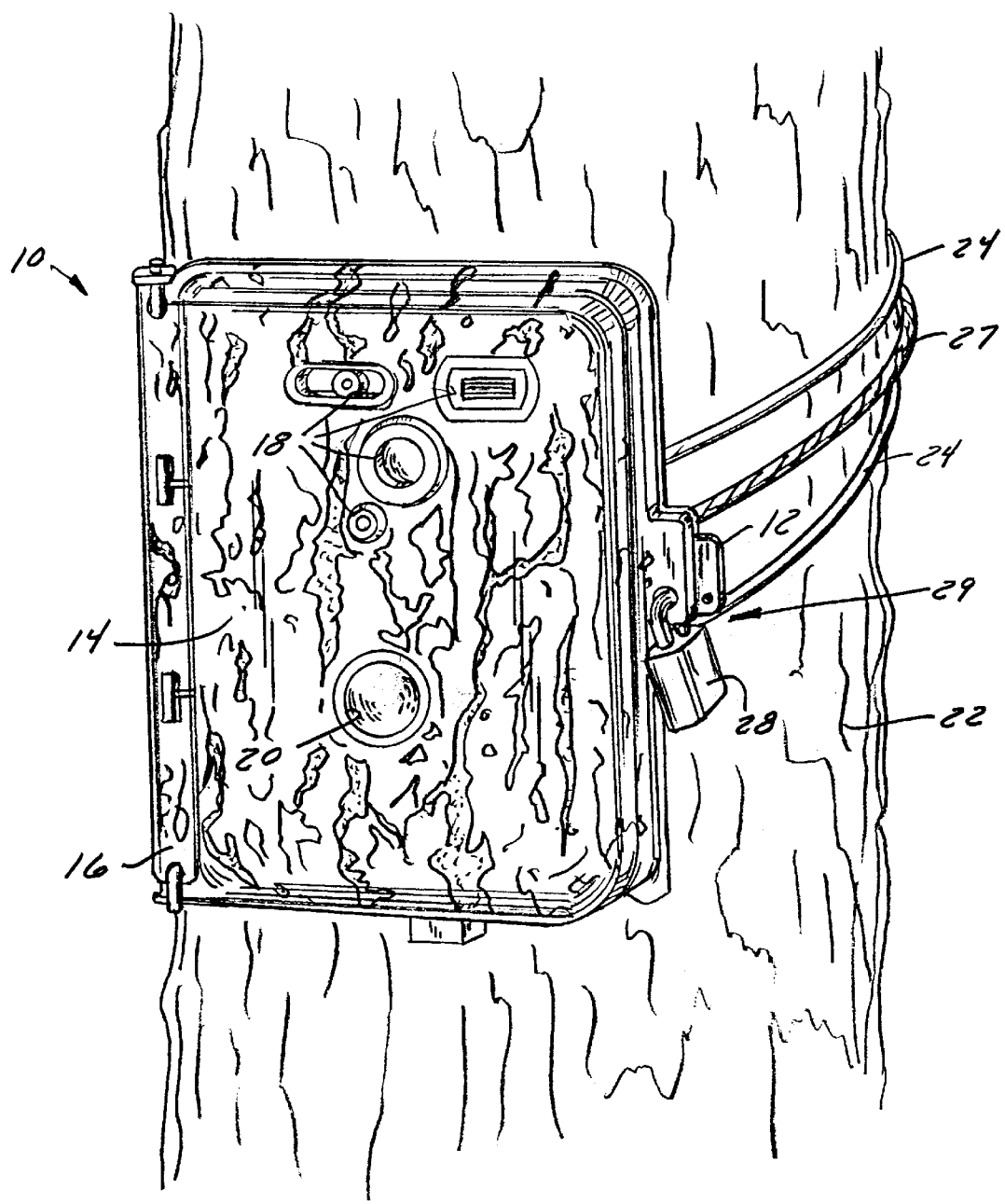
FIG. 1 is a perspective view of an enclosure for a wildlife surveillance assembly according to a first embodiment of the invention, illustrating the enclosure securely locked to a tree.
Figure 2:
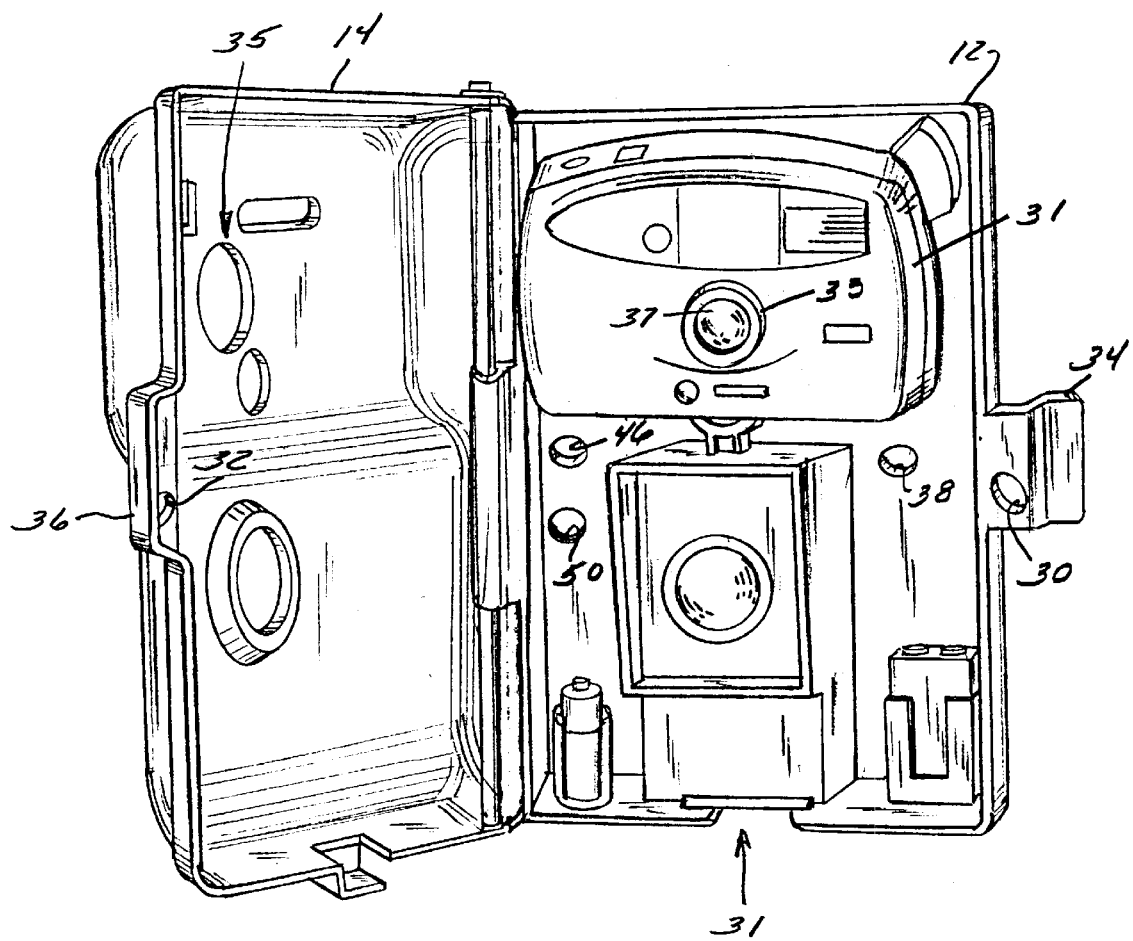
FIG. 2 is a perspective view of the enclosure shown in FIG. 1, showing the hinged components of the enclosure in an open position.

With initial reference to FIGS. 1 and 2, an enclosure 10 for a wildlife surveillance system is shown. The system includes, among other things, a camera, sensor, electronics, and a power supply. Enclosure 10 includes a base/housing 12 having an interior configured to retain the components of the surveillance system and is rotatably coupled to an outer cover portion 14 with a hinge 16. Cover 14 includes a number of openings 18, 20 for providing a view path for the components of the camera and sensor, respectively. Preferably, the openings are environmentally sealed to ensure that the components of the surveillance system are protected from the weather, insects, and the like. Also, the enclosure is preferably contoured and colored in 3-D camouflage to make the unit inconspicuous to its target.

Figure 3:
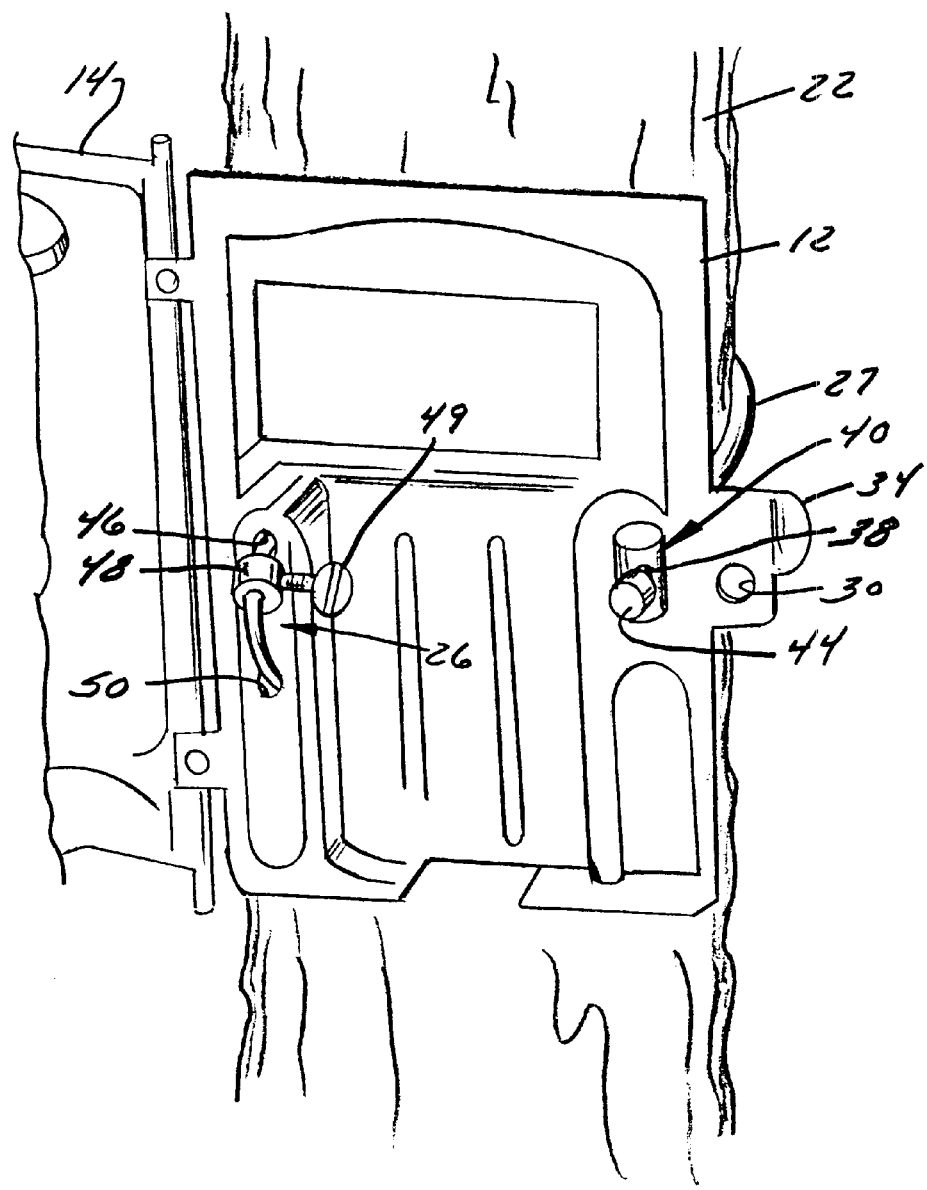
FIG. 3 is a perspective view similar to FIG. 2, illustrating the locking assembly of a preferred embodiment of the present invention coupled to the enclosure.
Figure 13:
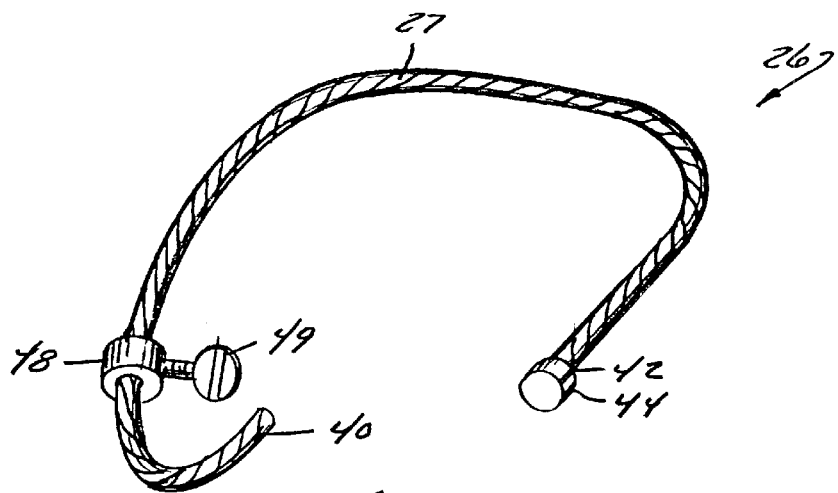
FIG. 13 is a perspective view of the locking assembly shown in FIG. 3.

With further reference to FIG. 1, the enclosure is coupled to a mounting structure 22 (such as a tree) with a support such as strap 24 and is securely locked to the tree with a flexible cable 27 of a locking assembly 26 (see FIGS. 3 and 13). Finally, base 12 and cover 14, when in a closed position, are secured with a lock of locking assembly 26, such as a padlock 28, to a latch 15. Preferably, padlock 28 is placed through openings 30, 32 formed in correspondingly shaped integral latch portions 34, 36 of housing 12 and cover 10, respectively. Notably, the enclosure is preferably made of a durable plastic to maintain its integrity in harsh environmental conditions.

With further reference to FIG. 2, a foam ring 33 is disposed around a lens 39 of a camera 37 that is part of surveillance system 31. Ring 33 is positioned intermediate camera 37 and inside surface 35 of cover 14, and is sandwiched by cover 14 and camera 37 when cover 14 is closed onto housing 12. As a result, spurious light (e.g., from the camera flash) does not impinge upon lens 39 when the system is activated, for example, by movement of a deer, and the integrity of system scouting is maintained. Notably, ring 33 may be coupled to camera 37 (or an inside surface of cover 14) with an adhesive which allows removal/replacement of the ring. Further, a sheet of thin, high-grade plexi-glass (see, for example, 67 in FIG. 5 directed to a preferred embodiment of the invention), or the like may be coupled to inside surface 35 of cover 14 to provide a window and to seal the components of surveillance assembly 31 from the environment. Preferably, an adhesive is used which allows ready removal/replacement of the window in the event the window gets scratched, etc.

Turning next to FIG. 3, enclosure 10 is shown coupled to tree 22 with cover 14 in an open position and with locking assembly 26 coupled or mated to housing 12. More particularly, housing 12 includes a first opening 38 through which a first end 40 of cable 27 is fed until a second end 42 of the cable abuts housing 12 at its inside surface around the perimeter of the first opening 38. Preferably, second end 42 of cable 27 includes an abutment or swaged ring 44 that is cylindrically shaped and which has a diameter greater that the diameter of the first opening 38 so as to prevent the cable from being pulled through the housing of the enclosure. Preferably, the ring is made of metal.

Cable 27 is then wrapped around the mounting structure (e.g., tree) and fed through a second opening 46 formed in housing 12. Thereafter, a tapped collar 48 having a thumb screw 49, collectively a slidable locking collar 47, is placed on the second end 42 of cable 27 and fed toward opening 46. First end 40 of cable 27 is then placed through a third opening 50 formed in housing 12 as tapped collar 48 is positioned on cable 27 in between second and third openings 46, 50, respectively. Cable 27 is then pulled taut so that it hugs the tree and thumbscrew 49 is tightened to securely lock the cable in position. Thereafter, the cover 14 can be closed and locked to the housing with padlock 28, such as that shown in FIG. 1, to secure the enclosure to the tree, thus minimizing the chance of theft.

Preferably, cable 27 is a vinyl-coated aircraft cable, thus preventing the cable from being cut with a bolt cutter. In addition, the first, second and third openings 40, 46 and 50, respectively, are sealed from weather, insects and the like in conventional fashion by using, for example, rubber gaskets. As a result, enclosure 10 is securely locked to mounting structure 22 with minimal user effort and without requiring tools.

Figure 4:
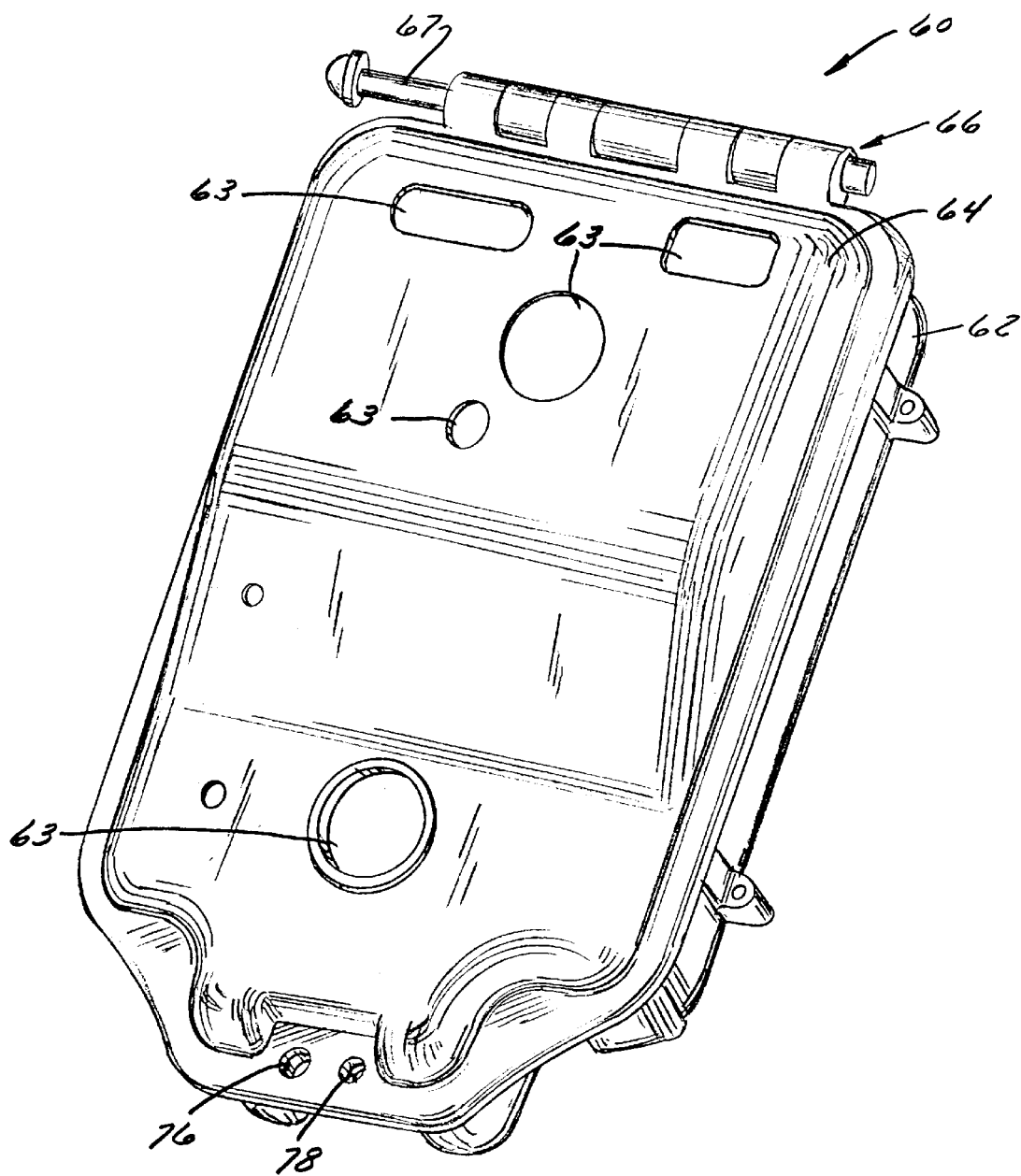
FIG. 4 is a perspective view of an alternate preferred embodiment of the enclosure, illustrating the housing and cover portions in a closed position.

Next, turning to FIG. 4, an enclosure 60 according to an alternate preferred embodiment does not include openings in the same compartment of the enclosure which houses the components of the surveillance system 31, thus maximizing the environmental integrity of the enclosure. Enclosure 60 includes a base/housing portion 62 and a cover 64 having a number of openings 63 to accommodate the components of the surveillance system 31, as before. However, in this embodiment, housing 62 and cover 64 are preferably rotatably coupled with a lockable hinge 66 that is mounted near the top of the unit, as opposed to the side. Moreover, with reference to FIGS. 4 and 6, housing 62 of enclosure 60 includes first and second compartments 68, 70, respectively, that are separated by a divider 71 and sealed from one another to isolate the locking assembly (see FIG. 13) coupled to enclosure 60 from the space in which the components of the surveillance apparatus are mounted, i.e., first compartment 68. In addition, base 62 and cover 64 include a pair of holes 72, 74 and 76, 78 that are aligned with one another, respectively, when cover 62 is in a closed position. A first set of corresponding holes 72, 76 are configured to accommodate a padlock (e.g., 28 in FIG. 1) to lock cover 64 and base 62 together to prevent unwanted access to the interior of enclosure 60. The other set of holes 74, 78 are preferably threaded to accommodate, for example, a thumbscrew for tightly clamping the cover to the base in an environmentally secure fashion. Note, a gasket (not shown) may be provided intermediate base 62 and cover 64, the gasket being clamped when the unit is closed to seal the interior of the enclosure from the surrounding environment.

Figure 5:
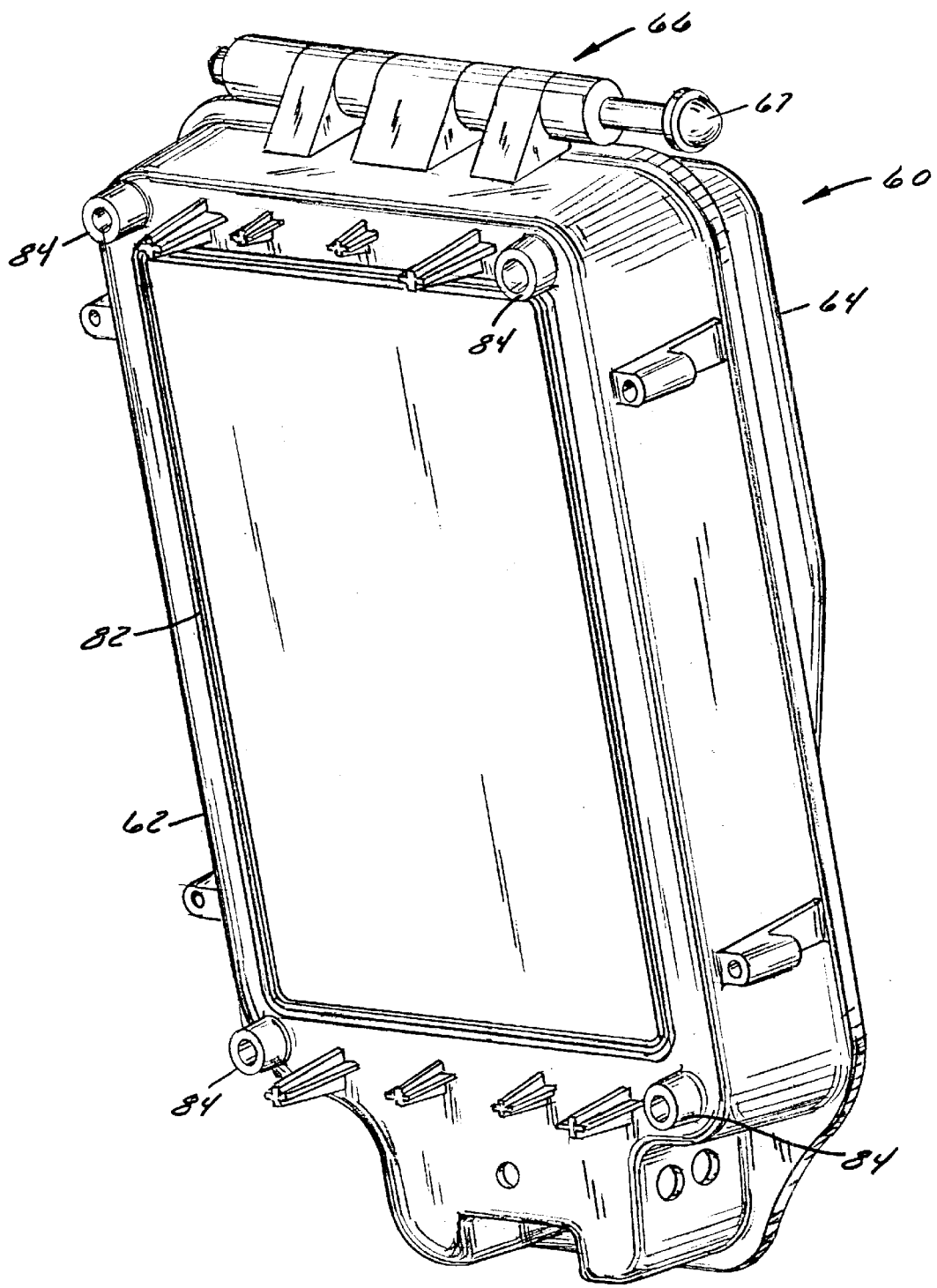
FIG. 5 is a perspective view of the enclosure of FIG. 4, illustrating the back of the housing portion of the enclosure.

FIG. 5 shows the enclosure 60 with cover 64 in the closed position and pin 67 of hinge 66 in a locked position, thus preventing free rotation of cover 64 relative to housing 62 (discussed below in conjunction with FIGS. 9–14). In addition, a back side 80 of housing 62, i.e., the side housing 62 which faces the structure (e.g., a tree) to which enclosure is 60 mounted, includes a raised gasket lip 82 formed generally around its perimeter and which is sized to accommodate a power source such as a battery pack (not shown). Further, a plurality of bosses 84 are provided on back side 80 of housing to attach a battery back cover (not shown) to housing 62. Notably, a gasket (not shown) may be placed intermediate lip 82 and the battery pack cover to assure waterproofing, etc.

Figure 6:
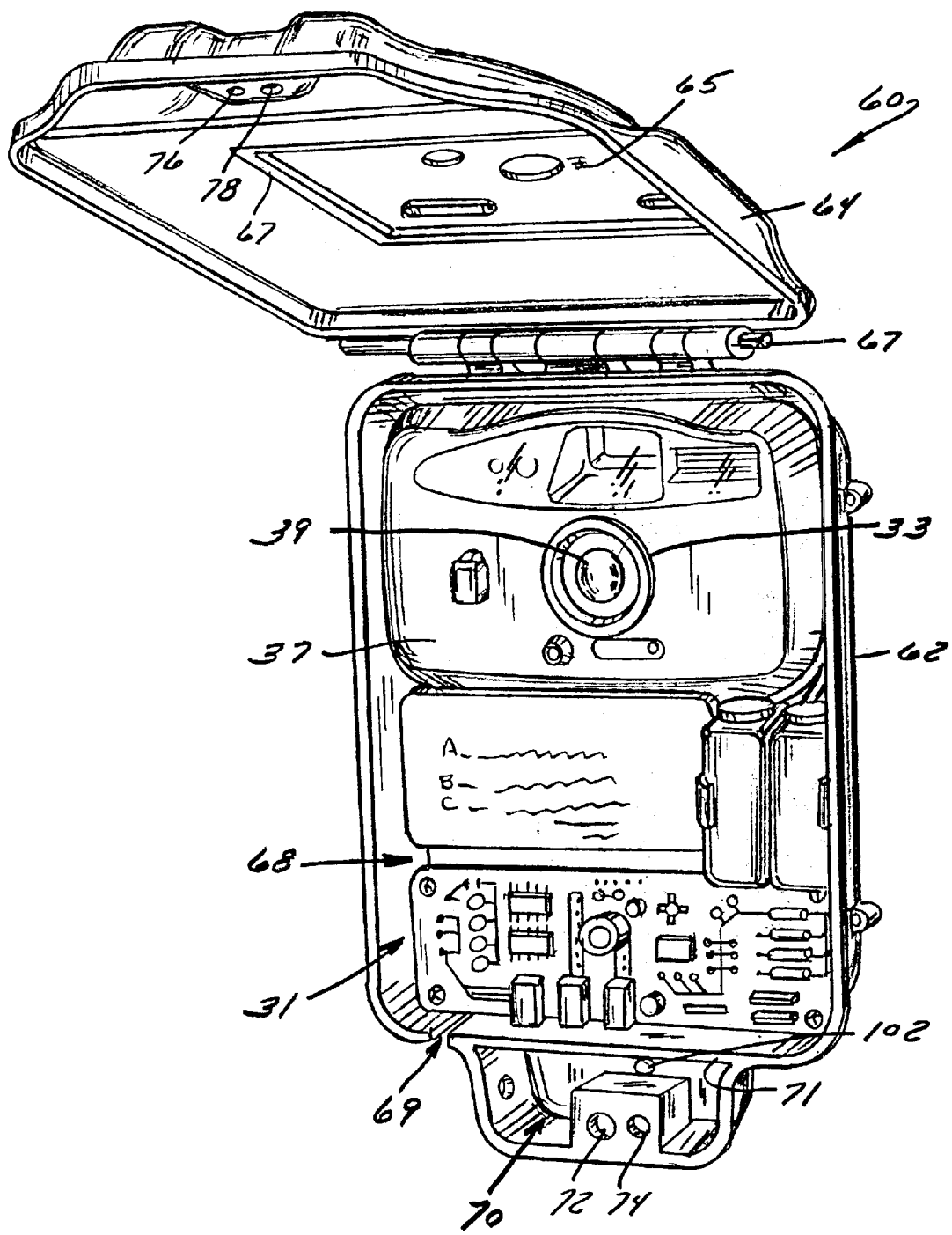
FIG. 6 is a perspective view of the enclosure of FIG. 4, illustrating the housing and cover of the enclosure in an open position, with the components of the surveillance assembly mounted therein.

With further reference to FIG. 6, cover 64 is in an open position with the components of the surveillance system 31 mounted in first compartment 68 of the housing. As described in further detail below, cover 64 may be maintained in the open position shown in FIG. 6 by slidably positioning pin 67 of the hinge 66. Further, the first compartment 68 of the housing includes an opening 69 to accommodate a toggle switch (not shown), for example, which may be adapted for controlling the operating modes of the surveillance system. Preferably, opening 69 and the toggle switch are sealed with, for example, a rubber gasket.

With further reference to FIG. 6, similar to enclosure 10 described above, enclosure 60 preferably includes a foam ring 33 disposed around a lens 39 of a camera 37 that is part of surveillance system 31. Ring 33 is positioned intermediate camera 37 and inside surface 65 of cover 64 and is sandwiched by cover 64 and camera 37 when cover 64 is closed. As a result, spurious light (e.g., from the camera flash) does not impinge upon lens 39 when the system is activated, for example, by movement of a deer, and thus the integrity of the scouting feature of the system is maintained. Notably, ring 33 may be coupled to camera 37 with an adhesive that allows removal/replacement of the ring. Further, a sheet of thin, high-grade plexi-glass (see, for example, 67 in FIG. 6), or the like may be coupled to inside surface 65 of cover 64 to provide a window and seal the contents of surveillance assembly 31 from the environment. Preferably, an adhesive is used which allows ready removal/replacement of the window in the event the window gets scratched, etc. Note that, in this case, ring 33, if included, is sandwiched by the camera and the plexi-glass window when cover 62 is closed.

Turning next to FIG. 7, housing 62 of the enclosure 60 is shown to include structure for mounting the components of the surveillance assembly therein. More particularly, a shelf 90 is included in first compartment 68 for supporting a camera while a section 91 of Velcro® (Velcro® is a registered trademark of Velcro Industries, Curacao, Netherlands) is attached, for example, with an adhesive, to a bottom surface 92 of the interior of housing 62. Further, a corresponding section of Velcro (not shown) is attached to the camera for coupling the camera to the Velcro on surface 92 so as to secure the camera within enclosure 60. Again, this structure for mounting the components of surveillance system 31 must be located so the components are aligned with the openings 63 in cover 64. In addition, openings 72, 74 are configured to accommodate a padlock and thumbscrew, as described previously. Second compartment 70 has opposed sidewalls 94, 96 that include holes 98, 100, respectively, for accommodating a security cable 27 of locking assembly 26 such as that shown in FIG. 13, and in FIGS. 1 and 3 associated with the first embodiment. In addition, a third opening 102 is formed in the back or bottom wall 104 of second compartment 70 to accommodate the free end of the cable when locking assembly 26 is coupled to enclosure 60.

With more particular reference to FIGS. 7 and 13, to securely lock enclosure 60 to a mounting structure such as a tree with locking assembly 26, the free end 40 of cable 27 is placed through first opening 100 formed in second compartment 70 and is pulled until abutment, i.e., swaged ring 44 on first end 42 of cable 27 is adjacent to and/or abuts an interior surface 106 of wall 96 adjacent opening 100. Then, cable 27 is wrapped around the tree and fed through second opening 98 formed in wall 94 of second compartment 70 and the tapped collar 48 is placed on the free end of cable 27. Next, the free end 40 of cable 27 is placed through third opening 102 formed in the back or bottom wall 104 of the second compartment and pulled until the cable is snug against the mounting structure. Finally, the screw 49 of tapped collar 48 is tightened to lock the collar to cable, and thus lock the cable in enclosure 60.

In this way, when the enclosure is closed and locked (e.g., with a padlock), not only are the contents of the enclosure securely maintained but the locking assembly is secured in the enclosure thus preventing theft of the entire enclosure.

Moreover, the security cable 27, and the corresponding openings 98, 100, 102 formed in second compartment 70, are isolated from the interior of first compartment 68, thus advantageously isolating the electronics, etc. of the surveillance assembly. Again, as in the previous embodiment, no tools or particular skills are required to manipulate the enclosure or secure the enclosure to the tree.

Turning next to FIG. 8, initially we note that opening 102 in the back wall of the second compartment 70 shown in FIG. 7 may be replaced with an opening 110 placed at the alternate location shown in FIG. 8. Continuing, FIG. 7 and the side view of the housing 62 in FIG. 8 show the female portions 112, 114, 116 of hinge 66 attached to housing 62 which include corresponding concentric openings. Notably, the openings of female portions 114 and 116 have a circular cross section, while opening 113 of female portion 112 has a hexagonal cross section for accommodating the correspondingly shaped locking pin 67 (see FIG. 14) which together function as described below.

Figure 11:
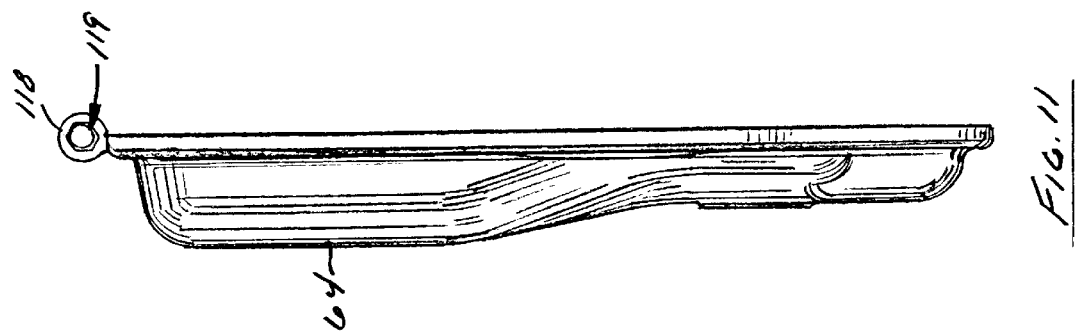
FIG. 11 is a side elevational view of the cover portion of FIG. 9.
Figure 10:
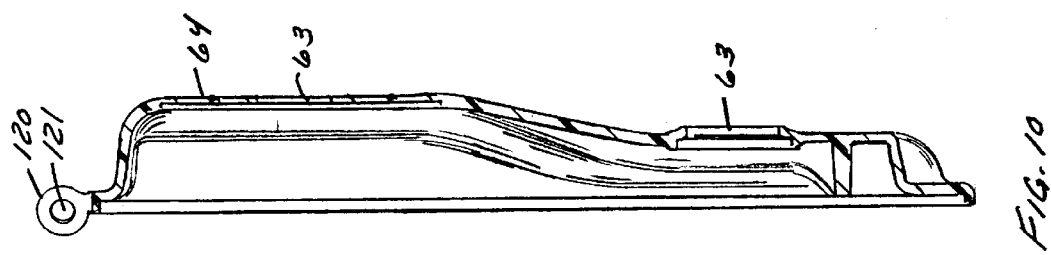
FIG. 10 is a cross-sectional side view of the cover of FIG. 9, taken along lines 10—10.
Figure 9:
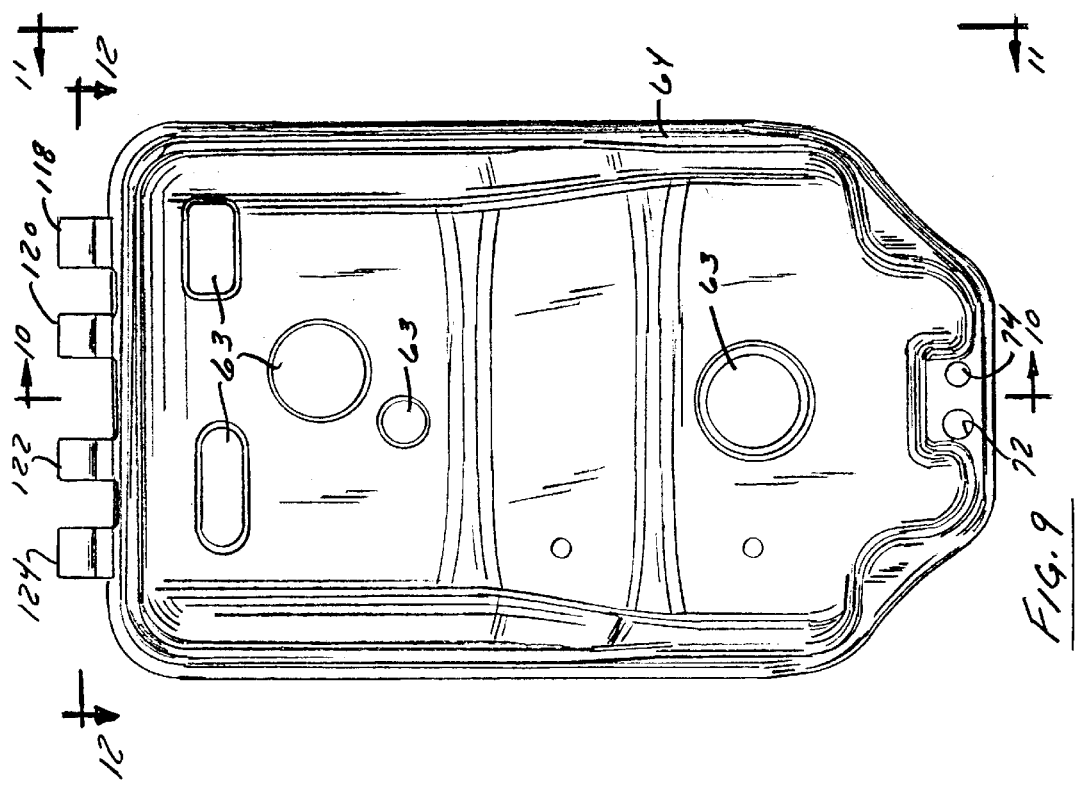
FIG. 9 is a plan view of the cover portion of the enclosure of FIG. 4.
Figure 12:
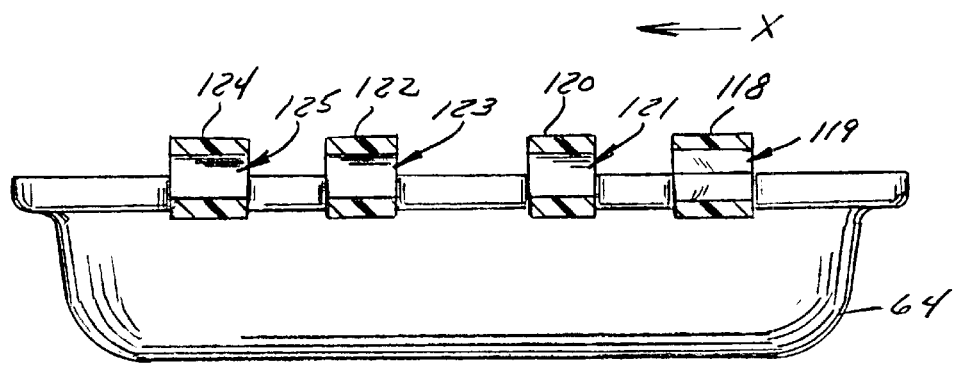
FIG. 12 is a cross-sectional view of the cover portion of FIG. 9, taken along lines 12—12.

FIG. 9 illustrates a plan view of cover 64 configured as described above and having a plurality of female portions 118, 120, 122, 124 of hinge 66 coupled thereto. FIG. 10 shows a side view of the cover including female portion 120 which includes an opening 121 having a circular cross section. FIG. 11 shows a similar view to FIG. 10 but the opposite side which illustrates female portion 118 including its opening 119 that has hexagonal cross section. A top cross sectional view of cover 64 is shown in FIG. 12 including the circular openings of female portions 120, 122, 124 and the hexagonal opening of female portion 118. When assembled, female portions 112, 114, 116 of housing 62 mate with female portions 118, 120, 122, 124 of cover 64.

Figure 14:
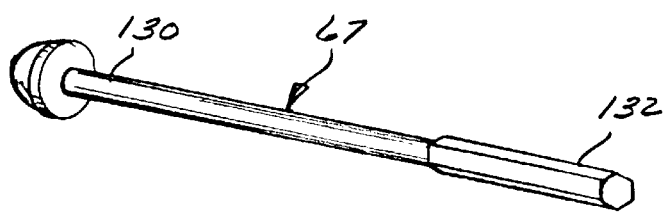
FIG. 14 is a perspective view of the pin of the preferred embodiment shown in FIG. 4.

Turning to FIG. 14, pin 67 is shown and includes a first end 130 having a circular cross section and a second end 132 having a hexagonal cross section. In operation, when pin 67 is fully inserted into female portions 112, 114, 116, 118, 120, 124 attached to cover 64 and housing 62 of enclosure 60, cover 64 is allowed to rotate relative to housing 62. As the pin is pushed from the right, in the direction marked "X" in FIG. 12, second end 132 of pin 67, which has a hexagonal cross section, locks into the associated hexagonal cross sectional openings of at least one of the female portions (e.g., opening 119 of female portion 118 and opening 113 of female portion 112) of hinge 66. As a result, the cover and housing become locked relative to one another.

Therefore, cover may 64 be opened as shown in FIG. 6 and then the pin may be inserted into the female portions of hinge 66 until the corresponding hexagonal male (i.e., second end 132 of pin 67) and female portions 112, 118 of hinge 66 lock. As a result, cover 64 of enclosure 60 can be held open for the user "hands free." Advantageously, this allows the user to manipulate the components of the surveillance assembly including, for example, changing the film in the camera and adjusting the operating mode of the assembly, with cover 64 conveniently out of the way.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. An enclosure for a wildlife surveillance system, the enclosure comprising:

a base configured to house the surveillance system;

a cover coupled to the base with a hinge so as to permit rotating movement therebetween; and a locking assembly that secures the enclosure to a mounting structure, said locking assembly preventing removal of the enclosure from said mounting structure without opening said cover of the enclosure.

2. The enclosure of claim 1, wherein both said base and said cover include a first pair of holes and a second pair of holes that are aligned with one another when the cover is in a closed position.

3. The enclosure of claim 2, wherein the first pair of holes are configured to accommodate a lock to lock the cover to the base.

4. The enclosure of claim 2, wherein the second pair of holes are threaded to accommodate a fastener to clamp the cover to the base.

5. The enclosure of claim 1, wherein the base further comprises first and second compartments and wherein said first and second compartments are environmentally isolated from one another.

6. The enclosure of claim 1, further comprising a foam insert disposed intermediate the surveillance system and an inside surface of said cover to minimize light reflected from the inside surface from interacting with the surveillance system.

7. The enclosure of claim 1, wherein said hinge further includes a pin and a plurality of adjacent female portions, said adjacent female portions being adapted to receive said pin, and wherein at least a portion of said pin and at least some of said adjacent female portions are configured to interlock so as to selectively prevent rotating movement of said cover relative to said base.

8. The enclosure of claim 1, wherein said base include first and second compartments environmentally isolated from one another, and wherein said locking assembly is coupled to said second compartment.

9. The enclosure of claim 1, wherein said locking mechanism includes:

a flexible cable having opposed ends and having an abutment coupled to one of said ends;

a collar slidably coupled to said flexible cable and adapted to be locked to said flexible cable at a desired position; and wherein said enclosure includes a plurality of openings through which said flexible cable is received.

10. The enclosure of claim 9, wherein said base includes first and second compartments environmentally isolated from one another, and wherein said plurality of openings are formed in one of said first and second compartments.

11. A locking assembly for an enclosure that houses a wildlife surveillance system and is coupled to a mounting structure, the locking assembly comprising:

a flexible cable having opposed ends and having an abutment coupled to one of said ends;

a collar slidably coupled to said flexible cable and adapted to be locked to said flexible cable at a desired position; and wherein the enclosure includes a plurality of openings through which said flexible cable is received.

12. The locking assembly of claim 11, wherein the enclosure has a base and a cover coupled to one another with a hinge and adapted to be locked in a closed position, and wherein the enclosure cannot be removed from the mounting structure without opening the cover of the enclosure.

13. The locking assembly of claim 12, wherein the base includes first and second compartments environmentally isolated from one another, and wherein the plurality of openings are formed in one of the first and second compartments.

14. A method of securing a wildlife surveillance system to a mounting structure, the method comprising the steps of:

provding a locking assembly;

providing an enclosure having a base and a cover, wherein the base has first and second compartments environmentally isolated from one another, and wherein one of the first and second compartments includes a plurality of openings; and securing the enclosure to the mounting structure by coupling the locking assembly to the openings such that the enclosure cannot be removed from the mounting structure without opening the cover.

15. The method of claim 14, wherein the locking assembly includes a flexible cable and a lock, and wherein the cover includes an opening adapted to align with one of the plurality of openings when the cover is closed on the base, and wherein said securing step includes mating the cable with others of the plurality of openings and locking the lock through the aligned openings of the cover and the base.

16. The method of claim 15, wherein the cable includes opposed ends, and wherein said mating step includes:

(a) feeding a first one of the opposed ends of the cable through a first one of the plurality of openings until an abutment at the second of the opposed ends is adjacent the first opening;

(b) feeding the first opposed end through a second one of the openings;

(c) positioning a slidable locking collar on the first opposed end;

(d) feeding the first opposed end through a third of the openings; and (e) locking the slidable locking collar to the cable.

17. An enclosure comprising:

a base configured to house a wildlife surveillance system;

a cover coupled to said base with a hinge so as to permit rotating movement therebetween;

a locking assembly that secures the enclosure to a mounting structure, said locking assembly preventing removal of the enclosure from the mounting structure without opening said cover of the enclosure;

a fastener clamping said cover to said base;

a plurality of holes provided on both said base and said cover, wherein said holes are aligned with one another when said cover is in a closed position;

a flexible cable having opposed ends and having an abutment coupled to one of said ends;

a collar slidably coupled to said flexible cable and adapted to be locked to said flexible cable at a desired position; and wherein the enclosure includes a plurality of openings through which said flexible cable is received.

18. The enclosure of claim 17, further comprising a foam insert disposed intermediate the surveillance system and an inside surface of said cover to minimize light reflected inside the enclosure from interacting with the surveillance system.

19. The enclosure of claim 18, further comprising:

a pin; and a plurality of adjacent female portions, wherein said adjacent female portions are adapted to receive said pin, and wherein at least a portion of said pin and at least some of said adjacent female portions are configured to interlock so as to selectively prevent rotating movement of said cover relative to said base.

20. The enclosure of claim 18, further comprising a strap that can be tightened to secure the enclosure to the mounting structure.

* * * * *